(12) United States Patent
Hinds et al.

(10) Patent No.: US 6,360,189 B1
(45) Date of Patent: Mar. 19, 2002

(54) DATA PROCESSING APPARATUS AND METHOD FOR PERFORMING MULTIPLY-ACCUMULATE OPERATIONS

(75) Inventors: Christopher Neal Hinds; David Vivian Jaggar; David Terrence Matheny, all of Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 09/144,264

(22) Filed: Aug. 31, 1998

Related U.S. Application Data

(63) Continuation-in-part of application No. 09/084,304, filed on May 27, 1998, now Pat. No. 6,282,634.

(51) Int. Cl.⁷ .................................................. G06F 7/38
(52) U.S. Cl. ............................ 703/2; 708/501; 708/523
(58) Field of Search ........................... 703/2; 708/501, 708/495, 523, 505

(56) References Cited

U.S. PATENT DOCUMENTS

| | | | | |
|---|---|---|---|---|
| 5,548,544 A | * | 8/1996 | Matheny et al. | 364/745 |
| 5,550,767 A | * | 8/1996 | Taborn et al. | 364/745 |
| 5,867,413 A | * | 2/1999 | Yeh | 708/501 |
| 5,892,698 A | * | 4/1999 | Naffziger | 364/748.07 |
| 5,917,741 A | * | 6/1999 | Ng | 364/748.03 |
| 6,115,729 A | * | 9/2000 | Matheny et al. | 708/501 |
| 6,148,314 A | * | 11/2000 | Matheny et al. | 708/497 |
| 6,282,634 B1 | * | 8/2001 | Hinds et al. | 712/210 |

FOREIGN PATENT DOCUMENTS

| | | | | |
|---|---|---|---|---|
| EP | 0 377 837 | * | 7/1990 | G06F/7/48 |
| EP | 0 472 148 | * | 2/1992 | G06F/7/48 |
| GB | 2 291 515 | | 1/1996 | |

OTHER PUBLICATIONS

Kouhei Nadehara, Miwako Hayashida and Ichiro Kuroda, 'A Low–power, 32–bit RISC Processor with Signal Processing Capability and its Multiply–Adder', IEEE 0–7803–2612–1 Jan. 1995 pp. 51–60.*

Vishwas M. Rao and Behrouz Nowrouzian, 'Rounding Techniques for Signed Binary Arithmetic', IEEE 0–7803–3143–5 1996, pp. 294–297.*

* cited by examiner

Primary Examiner—Russell W. Frejd
(74) Attorney, Agent, or Firm—Nixon & Vanderhye P.C.

(57) ABSTRACT

A data processing apparatus and method is provided for performing a multiply-accumulate operation A+(B*C) in response to a single instruction identifying said multiply-accumulate operation. The data processing operation comprises a multiplier for multiplying values B and C to generate an unrounded multiplication result, the multiplier further being arranged to generate first data required for rounding determination, and an adder for adding the unrounded multiplication result to a value A to generate an unrounded multiply-accumulate result, the adder further being arranged to generate second data required for rounding determination. Determination logic is then provided for using the first and second data to determine one or more rounding values required to produce a final multiply-accumulate result equivalent to the execution of a separate multiply instruction incorporating rounding, followed by a separate add instruction incorporating rounding. Rounding logic is then arranged to apply the one or more rounding values to generate the final multiply-accumulate result.

By this approach, dedicated multiply-accumulate logic can be provided to enable fast execution of a multiply-accumulate instruction, whilst producing a result which is compliant with the IEEE 754-1985 standard.

16 Claims, 10 Drawing Sheets

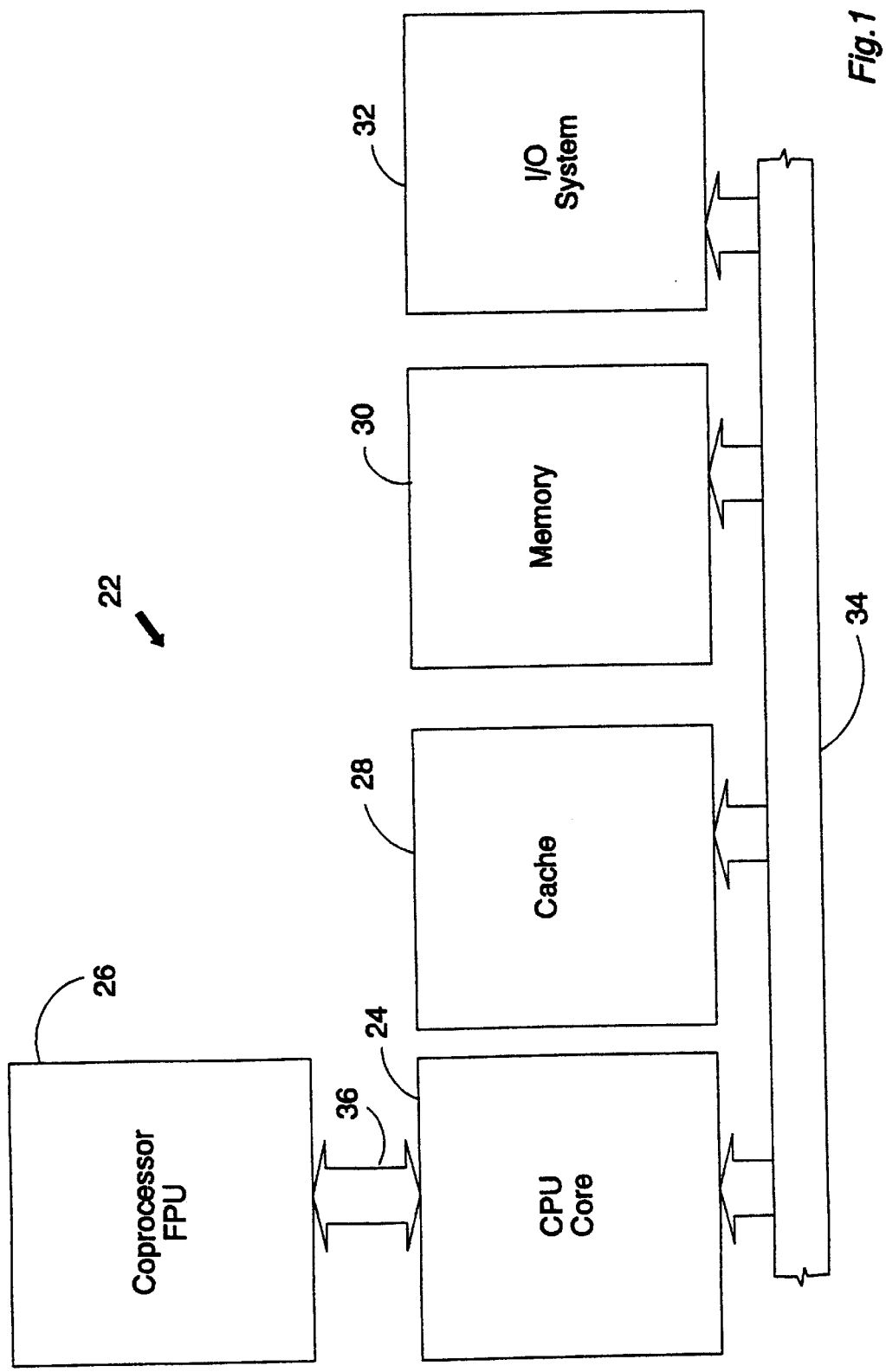

DATA PROCESSING APPARATUS AND METHOD FOR PERFORMING MULTIPLY-ACCUMULATE OPERATIONS

This application is a continuation-in-part of application Ser. No. 09/084,304, filed May 27, 1998, now U.S. Pat. No. 6,282,734.

BACKGROUND OF THE INVENTION

1. Field of the Invention

The present invention relates to a data processing apparatus and method for performing multiply accumulate operations.

2. Description of the Prior Art

It is common for data processing apparatus to be required to perform various floating point computations on data. To ensure a consistent approach in the way in which such floating point computations are handled by various data processing apparatus, a standard was produced in 1985 called the "IEEE Standard for Binary Floating-Point Arithmetic", ANSI/IEEE Std 754-1985, The Institute of Electrical and Electronic Engineers, Inc., New York, 10017 (hereafter referred to as the IEEE 754-1985 standard). This standard defined, amongst other things, that a multiplication operation should finish with a rounding operation, and similarly that an add, or accumulate, operation should finish with a rounding operation. The IEEE 754-1985 standard further provided a definition of a number of rounding operations which would be considered to be compliant with the IEEE 754-1985 standard.

It has been found that general purpose processors are not well suited to the performance of floating point computations, and hence this has led to the development of specialised floating point units (FPUs) to handle such computations.

One particular floating point computation which is commonly required is a multiply-accumulate operation, whereby two numbers are multiplied together, and the product is then added to a third number. Multiply-accumulate operations were not specifically discussed in the IEEE 754-1985 standard, but rather multiplication and accumulate operations were discussed separately. Although a multiply-accumulate operation can be performed by executing a multiplication instruction followed by a separate accumulate instruction, such an approach is relatively slow.

Hence, there has been a great deal of interest in developing FPUs arranged specifically to perform multiply-accumulate operations with increased speed. An example of such a FPU is disclosed in U.S. Pat. No. 4,969,118, which describes a FPU developed by IBM to perform a multiply-accumulate operation. In accordance with the IBM technique, a partial multiplier produces a partial product of two numbers, and this partial product is then passed to adder circuitry for adding to a third number. Hence, the multiply-accumulate operation is 'fused', in that the result of the multiplication is not independently determined prior to the accumulate operation. This approach significantly increases the speed of the multiply-accumulate operation.

Further, the multiplication is performed to an internal precision which contains all of the bits from the multiplication (for an n×n bit multiplication the result is 2 n bits) and the accumulation is then performed using all of the multiply bits. This provides a particularly accurate result, since no rounding is performed on the result of the multiplication before that result is used in the subsequent accumulation. However, it is apparent that this technique is not compliant with the IEEE 754-1985 standard since that standard defines that a rounding operation should be performed on the result of the multiplication.

Other examples of FPUs designed specifically to increase the speed of a multiply-accumulate operation and/or reduce circuit complexity can be found in U.S. Pat. Nos. 5,241,493, 5,375,078, 5,530,663 and EP-A-0,645,699, U.S. Pat. Nos. 4,866,652 and 4,841,467. None of these documents are concerned with the issue of rounding, and in particular none are concerned with producing results which are compliant with the IEEE 754-1985 standard.

An alternative approach used in the MIPS R10000 product is to retain the multiplier and adder as separate logic units. When performing a multiply-accumulate operation, rounding is applied to the output of the multiplier unit, and this output is then input to the adder logic unit, with the result of the adder logic unit also being rounded. Whilst this enables an IEEE 754-1985 compliant result to be achieved for a multiply-accumulate operation, it does not retain the speed benefits to be obtained from a specialised logic unit arranged specifically to perform multiply-accumulate operations.

It is an object of the present invention to provide a data processing apparatus and method for efficiently performing a multiply-accumulate operation in response to a single instruction whilst producing a result which is equivalent to the execution of a separate multiply instruction incorporating rounding, followed by a separate add instruction incorporating rounding.

SUMMARY OF THE INVENTION

Accordingly, the present invention provides a data processing apparatus for performing a multiply-accumulate operation A+(B*C) in response to a single instruction identifying said multiply-accumulate operation, comprising: a multiplier for multiplying values B and C to generate an unrounded multiplication result, the multiplier further being arranged to generate first data required for rounding determination; an adder for adding the unrounded multiplication result to a value A to generate an unrounded multiply-accumulate result, the adder further being arranged to generate second data required for rounding determination; determination logic for using the first and second data to determine one or more rounding values required to produce a final multiply-accumulate result equivalent to the execution of a separate multiply instruction incorporating rounding, followed by a separate add instruction incorporating rounding; and rounding logic for applying the one or more rounding values to generate the final multiply-accumulate result.

In accordance with the present invention, a multiplier is provided to generate an unrounded multiplication result by multiplying values B and C, and further to generate first data required for rounding determination. Similarly, an adder is provided to generate an unrounded multiply-accumulate result by adding a value A to the unrounded multiplication result, and further to generate second data required for rounding determination. Determination logic is then arranged to use the first and second data to determine one or more rounding values required to produce a final multiply-accumulate result equivalent to the execution of a separate multiply instruction incorporating rounding, followed by a separate add instruction incorporating rounding.

By this approach, dedicated multiply-accumulate logic can be provided to enable fast execution of a multiply-accumulate instruction, whilst producing a result which is compliant with the IEEE 754-1985 standard.

In one embodiment, the determination logic can be arranged to determine more than one rounding value to be applied at appropriate steps during the addition operation. However, in preferred embodiments, the determination logic is arranged to generate a single rounding value to be applied by the rounding logic to the unrounded multiply-accumulate result to generate the final multiply-accumulate result. This approach yields further speed improvements in the execution of the multiply-accumulate operation.

In preferred embodiments, the first data generated by the multiplier comprises guard and sticky bits, and the determination logic comprises first logic for determining a multiplier rounding value from the first data. Further, the first data preferably comprises one or more least significant bits of the multiplication result, which are also used in the generation of the multiplier rounding value. In such preferred embodiments, the determination logic further comprises second logic for determining the one or more rounding values from the multiplier rounding value and the second data.

In preferred embodiments, the adder comprises an alignment shifter for aligning the smaller of the value A and the multiplication result prior to performing the addition, and a detection unit for detecting whether the bits shifted out by the alignment shifter are all ones or all zeros. In this embodiment, the second data generated by the adder preferably comprises guard and round bits and the output of the detection unit.

It will be apparent that the multiplier could be arranged in a number of ways.

However, in preferred embodiments, the multiplier comprises a multiplication unit for generating a partial result in carry-save format and a product adder for producing the multiplication result. Further, the multiplier preferably further comprises a sticky adder for adding together a number of least significant bits of the partial product generated by the multiplication unit, and a guard and sticky bit generator for generating guard and sticky bits from the output of the sticky adder.

It will be appreciated that there are a number of ways in which the final multiply-accumulate result may be generated using the one or more rounding values. In preferred embodiments, that values A, B and C consist of a mantissa and an exponent, which are manipulated separately. Hence, in preferred embodiments, the unrounded multiply-accumulate result comprises a mantissa and an exponent, the data processing apparatus further comprises an incrementer for incrementing the mantissa, and the rounding logic comprises a multiplexer for outputting either the mantissa or the incremented mantissa as a final mantissa of the final multiply-accumulate result, in dependence upon one of said one or more rounding values generated by the determination logic. In such preferred embodiments, the one rounding value preferably comprises a final increment signal input to the multiplexer to indicate whether the mantissa or the incremented mantissa should be output as the final mantissa.

It will be appreciated that when incrementing the mantissa, an overflow condition may arise. To account for this, the rounding logic preferably further comprises exponent incrementing logic for incrementing the exponent if the incrementing of the mantissa resulted in an overflow, and the incremented mantissa is selected as the final mantissa.

In preferred embodiments, the determination logic comprises a first converter for receiving the second data generated by the adder and compensating for any shift right normalization applied to the unrounded multiply-accumulate result by the adder. Further, the determination logic is preferably arranged to determine a multiplier rounding value from the first data and the determination logic preferably further comprises a second converter for applying the multiplier rounding value to the output of the first converter circuit. In such embodiments, the determination logic preferably further comprises a third converter for applying a predetermined rounding formula to the signals output from the second converter to generate the one or more rounding values.

Viewed from a second aspect, the present invention provides a method of performing a multiply-accumulate operation A+(B*C) in response to a single instruction identifying said multiply-accumulate operation, comprising: multiplying values B and C to generate an unrounded multiplication result, and generating first data required for rounding determination; adding the unrounded multiplication result to a value A to generate an unrounded multiply-accumulate result, and generating second data required for rounding determination; using the first and second data to determine one or more rounding values required to produce a final multiply-accumulate result equivalent to the execution of a separate multiply instruction incorporating rounding, followed by a separate add instruction incorporating rounding; and applying the one or more rounding values to generate the final multiply-accumulate result.

BRIEF DESCRIPTION OF THE DRAWINGS

The present invention will be described, further by way of example only, with reference to a preferred embodiment thereof as illustrated in the accompanying drawings, in which:

FIG. 1 is a block diagram illustrating elements of a data processing apparatus in accordance with preferred embodiments of the present invention;

DESCRIPTION OF A PREFERRED EMBODIMENT

Figure 2A:
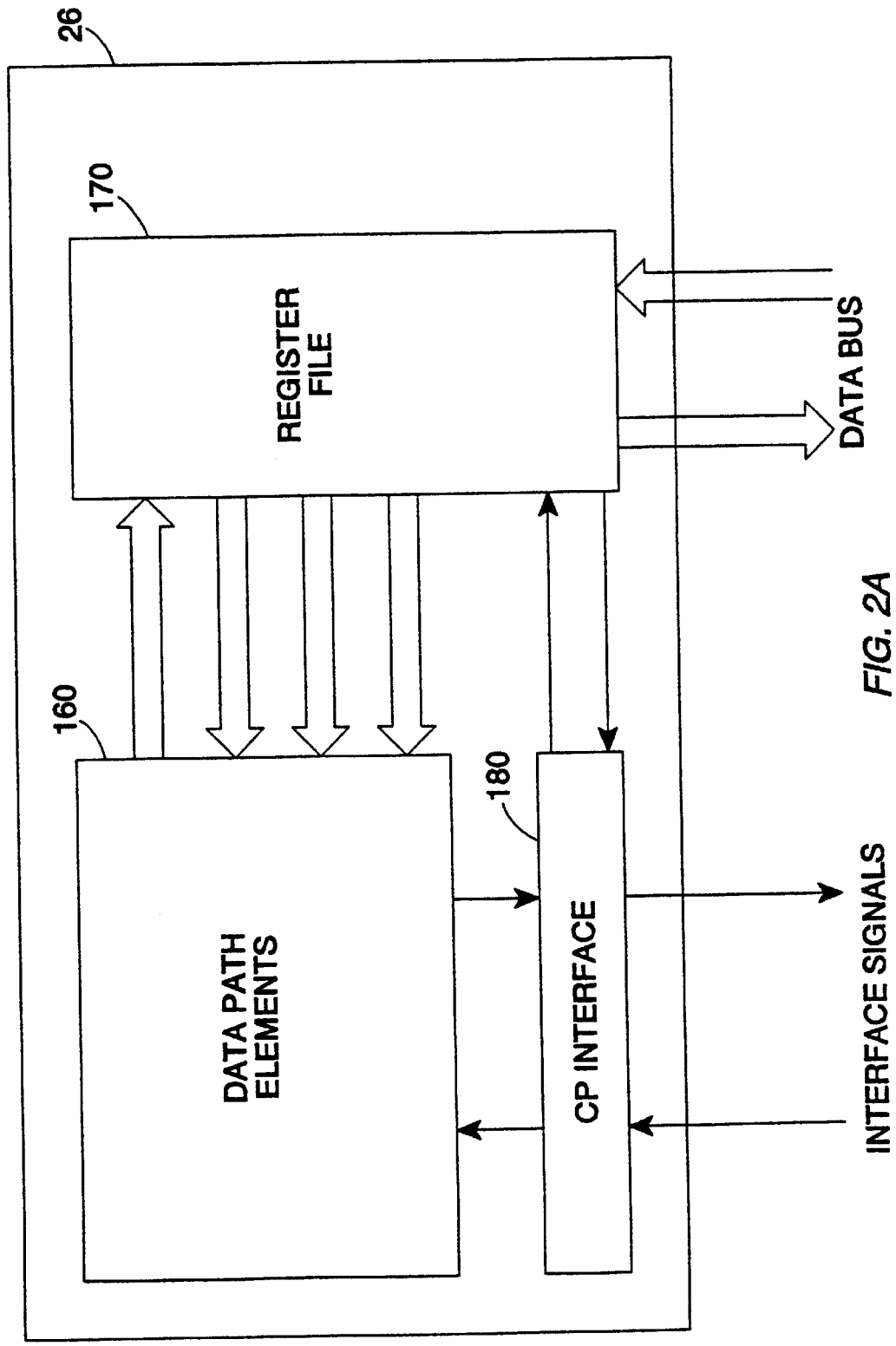
FIG. 2A is a block diagram illustrating elements of the FPU coprocessor in accordance with preferred embodiments of the present invention.

FIG. 1 illustrates a data processing system 22 comprising a main processor 24, a floating point unit (FPU) coprocessor 26, a cache memory 28, a main memory 30 and an input/output system 32. The main processor 24, the cache memory 28, the main memory 30 and the input/output system 32 are linked via a main bus 34. A coprocessor bus 36 links the main processor 24 to the floating point unit coprocessor 26.

In operation, the main processor 24 (also referred to as the ARM core) executes a stream of data processing instructions that control data processing operations of a general type including interactions with the cache memory 28, the main memory 30 and the input/output system 32. Embedded within the stream of data processing instructions are coprocessor instructions. The main processor 24 recognizes these coprocessor instructions as being of a type that should be executed by an attached coprocessor. Accordingly, the main processor 24 issues these coprocessor instructions on the coprocessor bus 36 from where they are received by any attached coprocessors. In this case, the FPU coprocessor 26 will accept and execute any received coprocessor instructions that it detects are intended for it. This detection is via a coprocessor number field within the coprocessor instruction.

FIG. 2A is a block diagram illustrating in more details the FPU coprocessor 26 of FIG. 1. As illustrated in FIG. 2A, the FPU 26 has a data path elements block 160 for performing the floating point operation, a coprocessor interface 180 for interfacing with the main processor 24 via the coprocessor bus 36, and a register file 170 for storing, amongst other things, the input values for the floating point operation and the result of the floating point operation.

When a floating point instruction is passed by the main processor to the FPU 26, it is received by the coprocessor interface 180, which determines whether the floating point instruction can be processed by the FPU 26. Hence, if for any reason, the data path elements block 160 is unable to begin executing a new instruction at the time that new instruction is received, the coprocessor interface 180 will notify the main processor accordingly. However, assuming the instruction can be executed, the coprocessor interface 180 generates control signals for passing to the data path elements block 160 to initiate the floating point operation.

Prior to execution of the floating point operation, the input values for the operation are passed over the data bus to the register file 170. The coprocessor interface 180 then sends control signals to the register file 170 to cause the input values to be stored in the appropriate source registers.

When the floating point operation is initiated, the contents of the source registers are output from the register file 170 to data path elements block 160. Further, on completion of the floating point operation, the result is passed from the data path elements block to the register file 170 for storing in the appropriate destination register.

Figure 2B:
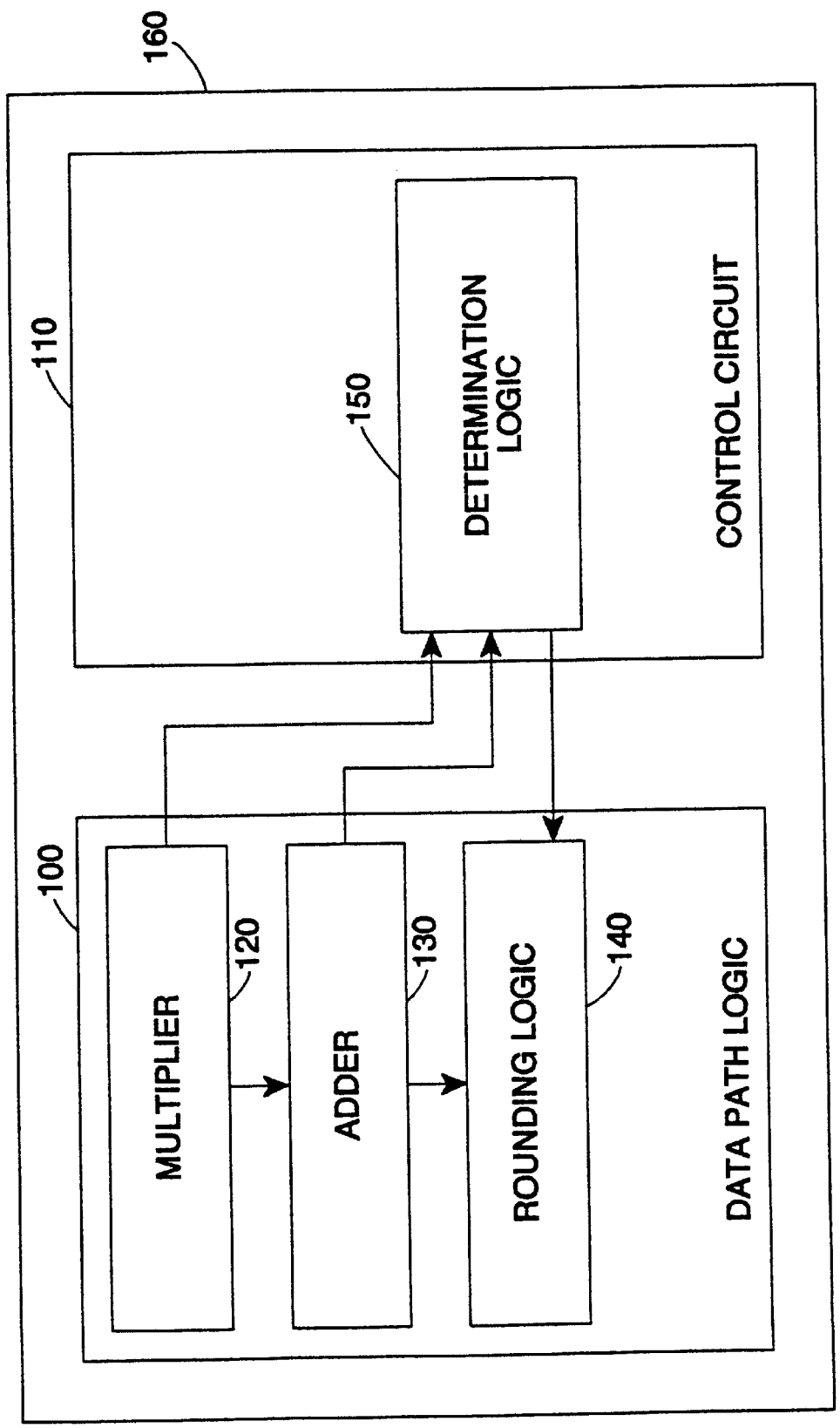
FIG. 2B is a block diagram illustrating in more detail the data path elements block of FIG. 2A.

FIG. 2B is a block diagram illustrating in more detail the data path elements block 160 of FIG. 2A. The data path elements block 160 consists of data path logic 100 and a control circuit 110. The data path logic 100 has a multiplier 120 for multiplying values B and C to produce a multiplication result and an adder 130 for adding the value A to the multiplication result. Further, rounding logic 140 is provided for applying a rounding value to the multiply-accumulate result output by the adder 130.

The control circuit 110 receives data identifying the instruction to be performed by the FPU 26 (e.g. add, multiply, or multiply-accumulate) and the input values for the operation (e.g. A, B and C), and then controls the operation of the various logic elements in the data path logic 100 by passing various control signals to the data path logic. Further, at various points in the data path, the data path logic is arranged to provide signals to the control circuit which are used by the control circuit to generate appropriate control signals. These signals will be discussed in more detail later with reference to FIGS. 3 and 4.

For the sake of clarity, only the transfer of signals between the data path logic and the control logic that relate to rounding are illustrated in FIG. 2. Hence, the multiplier 120 sends first data signals required for rounding determination to determination logic 150 within the control circuit 110, and similarly the adder 130 provides second data signals required for rounding determination to the determination logic 150. The determination logic 150 then uses these data signals to generate a rounding value which it then outputs to the rounding logic 140 within the data path logic 100. The rounding logic 140 then uses the rounding value to produce a final multiply-accumulate result.

As will be discussed in more detail later, the determination logic is arranged to generate a rounding value which, when applied by the rounding logic 140, will ensure that the final multiply-accumulate result is equivalent to the result that would have been obtained by execution of a separate multiply instruction incorporating rounding, followed by a separate add instruction incorporating rounding.

In accordance with the preferred embodiments of the present invention, the FPU 26 is arranged to perform a floating point multiply-accumulate chained (FMAC) operation, whereby the multiply-accumulate operation is performed with an effective rounding between the multiply and the accumulate. In preferred embodiments, a four stage pipeline is employed having execution stages E1 to E4. The operations performed in each stage in preferred embodiments for a multiply-accumulate operation are as follows:

E1:
  Multiply the mantissas of the multiplier (Mant(C)) and the multiplicand (Mant(B)), producing a result in redundant form.
  Sum the exponents of the multiplier and the multiplicand to form a product exponent.
  Compare this with the exponent of the augend, select the larger operand of the augend or product, and compute the shift count for the smaller operand.

E2:
  Sum the two parts of the multiplication result into a non-redundant form.
  Connect the smaller of the augend and the product to a register connected to an alignment shifter.
  Connect the larger of the augend and the product to a register connected to an augend negate multiplexer.
  Compute if the product needs to be incremented to be correctly rounded.

E3:
  Shift the smaller of the augend and the product to align with the larger addend.
  Negate the augend if the operation is an effective subtraction.
  Add the smaller and the larger addends.

E4:
  Compute the position of the leading 1 and 0 in the sum
  Compute if rounding is needed from the multiply round calculation and the sum round calculation.
  Increment the sum if needed.
  Normalize the sum.
  Calculate the final exponent, increment the exponent if the sum overflowed in calculation or rounding.

The FMAC architecture outlined above is compatible with the IEEE 754-1985 standard by providing the bit-accurate result as a floating point multiply followed by a floating point addition, both rounded using the same rounding mode. The cycle count for the FMAC architecture is only one greater than the prior art IBM approach described earlier, while the throughput remains at 1 cycle per operation for single precision operations and 2 cycles per operation for double precision.

The data path logic 100 used to implement the above FMAC architecture in preferred embodiments of the present invention will now be described in more detail with reference to FIGS. 3 and 4. FIGS. 3A–3D are diagrams illustrating elements of the data path logic used to process the mantissas of the input values, whilst FIGS. 4A and 4B are diagrams illustrating elements of the data path logic used to process the exponents of the input values.

Figure 3A:
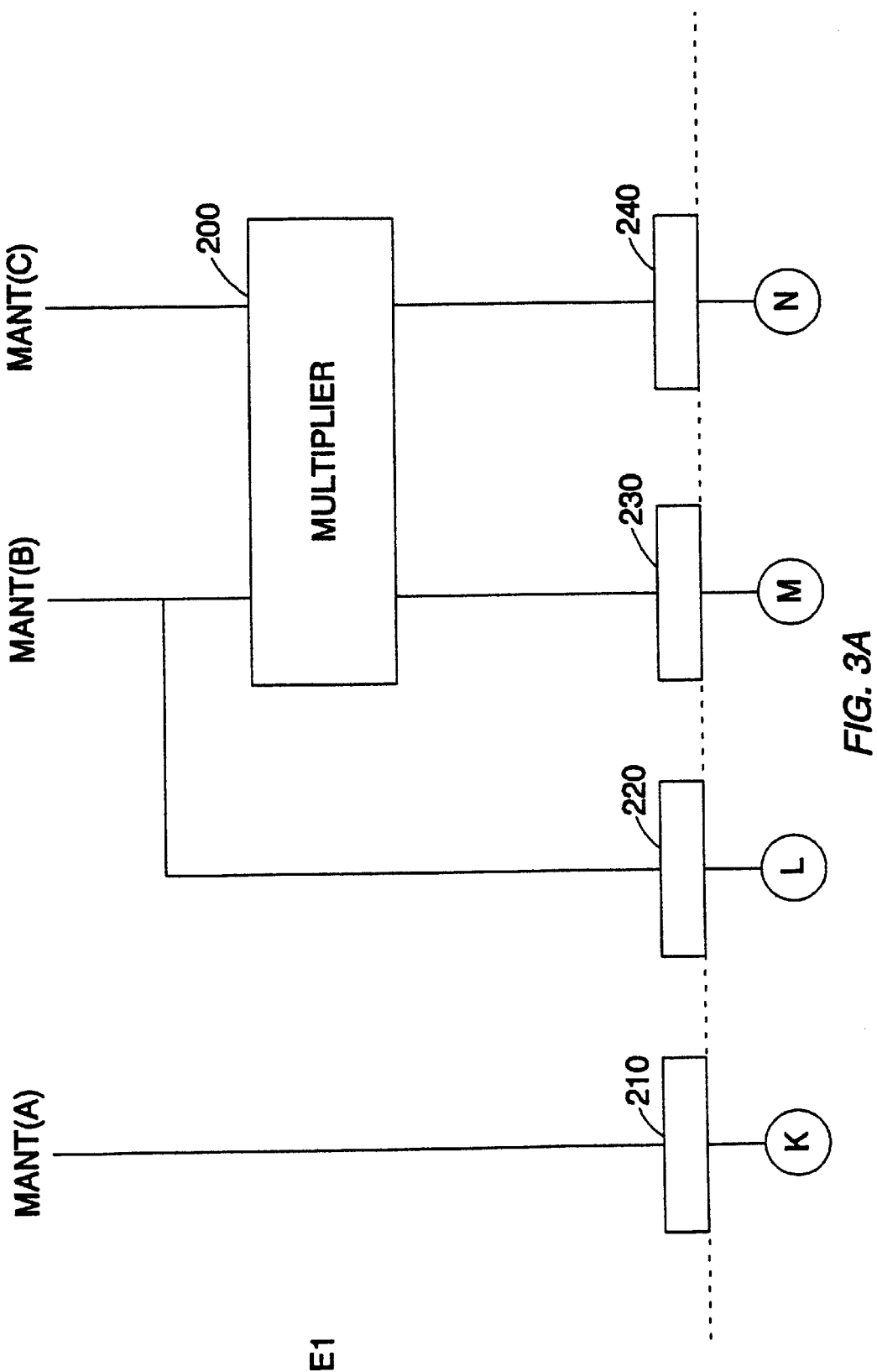
FIGS. 3A–3D are diagrams illustrating elements of the data path logic used to process the mantissas in accordance with preferred embodiments of the present invention.

FIG. 3A illustrates the processing performed on the mantissas during stage E1 of the pipeline. The mantissas for the values B and C are input to a multiplier 200, which may be of any known design, and the multiplier is arranged to multiply the values B and C together to generate a product in carry-save format. The sums data is output to the register 230, and the carry data is output to the register 240. Meanwhile, the mantissa for the value A is passed directly to a register 210. Further, to support pure addition of A and B, the mantissa of the value B is also output to a register 220.

Figure 4A:
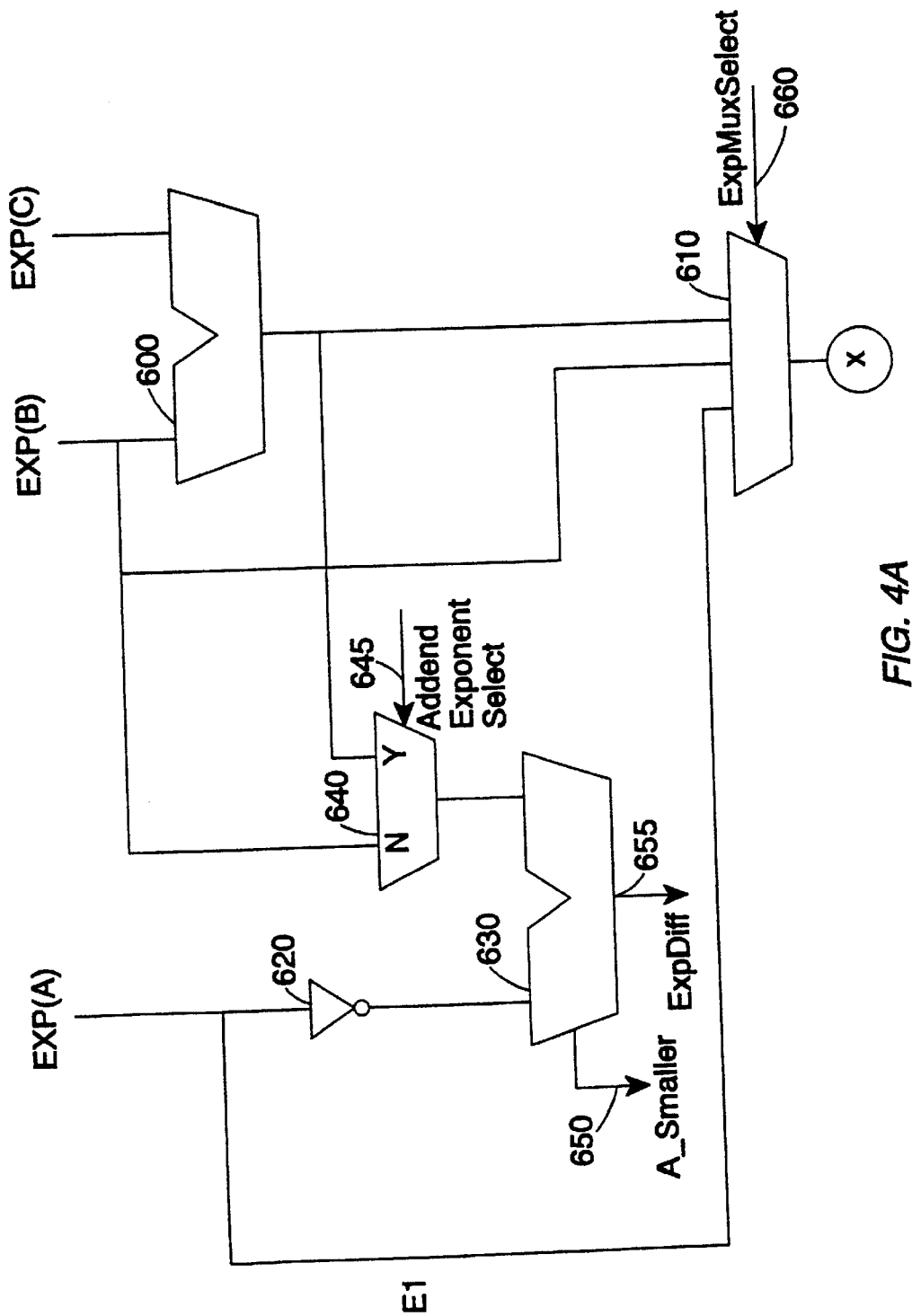
FIGS. 4A and 4B are diagrams illustrating elements of the data path logic used to process the exponents in accordance with preferred embodiments of the present invention.

FIG. 4A illustrates the processing performed on the exponents during stage E1 of the pipeline. The exponents of the values B and C are input to a product exponent adder 600 where they are added to generate a product exponent which is output to an exponent select multiplexer 610. The product exponent is also provided to a multiplexer 640 which receives as a second input the exponent of the value B. The multiplexer 640 is arranged to receive an addend exponent select signal from the control circuit 110 to control which input is output from the multiplexer 640. Since the control circuit 110 receives data identifying the type of operation to be performed, it can generate an addend exponent select signal to cause the multiplexer 640 to select the exponent of the value B if a pure add operation of A and B is to be performed, or to select the product exponent if a multiply-accumulate operation is to be performed.

The output from the multiplexer 640 is passed to an adder 630 which is also arranged to receive as a second input the exponent of the value A as inverted by inverter 620. Since the exponent of the value A has been inverted, the adder 630 acts as an exponent subtractor and thus outputs over path 655 a signal (referred to hereafter as the ExpDiff signal) identifying the difference between the two input exponents. Further, the adder 630 is arranged to output a signal over path 650 indicating whether the exponent of the value A is smaller than the other input exponent. This A_Smaller signal is passed along with the ExpDiff signal to the control circuit for use by the control circuit to generate subsequent control signals for the data path logic.

The exponent select multiplexer 610 receives three inputs, namely the A exponent, the B exponent and the product exponent. The purpose of the exponent select multiplexer 610 is to select the largest exponent relevant to the operation being performed. The exponent select multiplexer 610 is controlled by a control signal generated by the control circuit 110. Since the control circuit knows which operation is being performed, and has received the A_Smaller signal from the adder 630, it has all the information required to determine which of the three inputs to exponent select multiplexer 610 should be output. Hence, if a pure add operation is being performed, then the ExpMuxSelect signal will indicate whether the A exponent or the B exponent should be output, dependent on which is larger (as indicated by the A_Smaller signal). If a pure multiplication operation is being performed, then the ExpMuxSelect signal will cause the product exponent to be selected. Finally, if a multiply-accumulate operation is being performed, then the ExpMux-Select signal will indicate whether the A exponent or the product exponent should be output, dependent on which is larger.

Figure 4B:
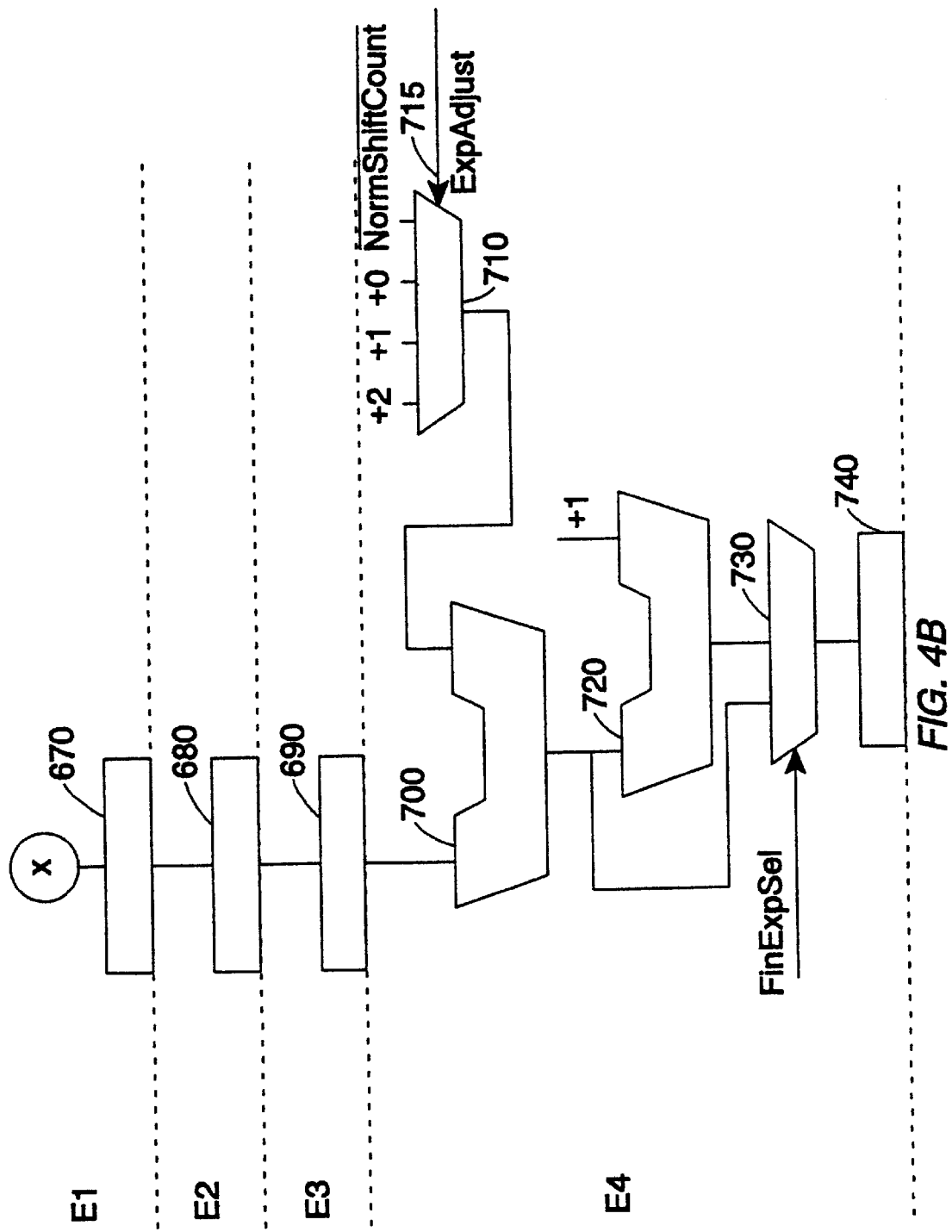

As indicated in FIG. 4B, the output from the exponent select multiplexer 610 is passed to a register 670. In stages E2 and E3 of the pipeline, this output value is merely passed to registers 680 and 690, respectively.

Figure 3B:
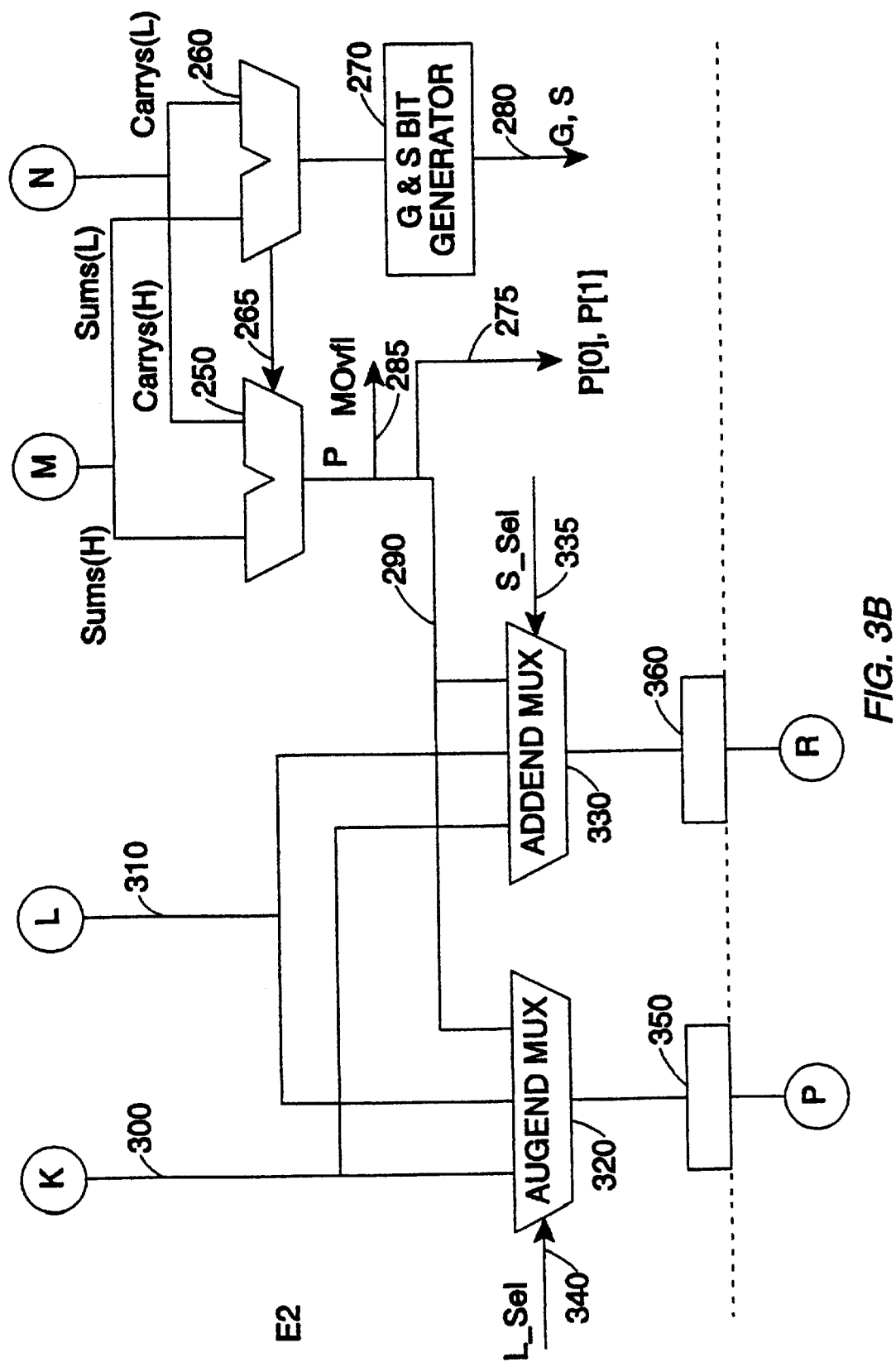

FIG. 3B illustrates the mantissa processing performed in stage E2 of the pipeline. The sum and carry data from the registers 230 and 240, respectively, are split, such that the most significant bits of the sum and carry data are passed to a product adder 250 and the least significant bits of the carry and save data are passed to a sticky adder 260.

The inputs to the sticky adder 260 are added together, and then output to a guard and sticky bit generator 270. The guard and sticky bits determined by generator 270 are then output over path 280 to the control circuit 110. If the addition of the inputs to the sticky adder 260 results in an overflow, then the overflow bit is passed over path 265 to the product adder 250. The inputs to the product adder are added together to generate a product P, taking into account any overflow bit received over path 265. At this stage, the product P is unrounded and unnormalized.

The product P is supplied to an augend multiplexer 320 and an addend multiplexer 330, these multiplexers also being arranged to received the mantissas of values A and B from registers 210 and 220, respectively. Further, a number of least significant bits of product P, in preferred embodiments bits 0 and 1, are output over 275 to the control circuit 110. As will be appreciated by those skilled in the art, based on the least significant bits output over path 275 and the guard and sticky bits output over path 280, the control circuit can be arranged to generate a rounding value (referred to hereafter as MulRound) indicating whether the multiplication result P should be rounded. However, although the control circuit generates MulRound, no rounding is performed at this stage in preferred embodiments.

Additionally, a MOvfl signal is output over path 285 for subsequent use by the control circuit during rounding, the MOvfl signal having a logic 1 value if the output of the product adder 250 overflowed, and having a logic 0 value if the output of the product adder 250 did not overflow.

The augend multiplexer 320 and the addend multiplexer 330 are controlled by control signals, namely a larger select (L_Sel) 340 and a smaller select (S_Sel) 335 signal respectively, these signals being generated by the control circuit. Since the control circuit knows which operation is being performed, and has received the A_Smaller signal from the adder 630, it has all the information required to determine which of the three inputs to the augend multiplexer 320 and addend multiplexer 330 should be output. Hence, if a pure add operation is being performed, then the L_Sel signal will cause the augend multiplexer 320 to select the larger of values A and B (as indicated by the A_Smaller signal derived from the exponents) whilst the S_Sel will cause the addend multiplexer 330 to select the smaller of values A and B. If a pure multiplication operation is being performed, then the L_Sel signal will cause the product P to be selected by the augend multiplexer, whilst the S_Sel signal will cause the addend multiplexer to output a zero value. Finally, if a multiply-accumulate operation is being performed, then the L_Sel signal will cause the augend multiplexer 320 to select the larger of values A and P (as indicated by the A_Smaller signal derived from the exponents) whilst the S_Sel will cause the addend multiplexer 330 to select the smaller of values A and P. The outputs from the augend multiplexer 320 and the addend multiplexer 330 are then stored in registers 350 and 360 for subsequent use in stage E3 of the pipeline.

Figure 3C:
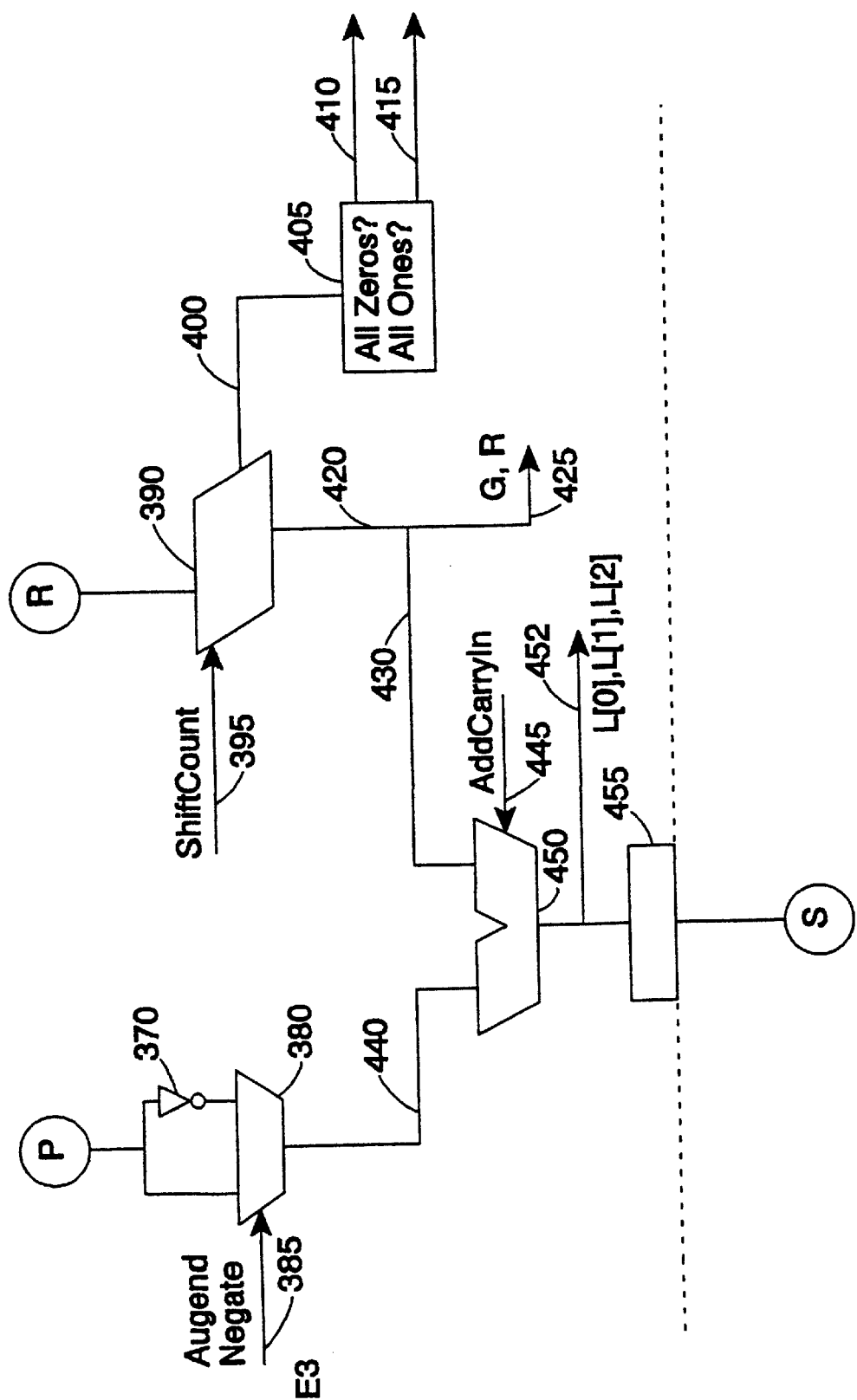

FIG. 3C illustrates the mantissa processing performed in stage E3 of the pipeline. The smaller value stored in register 360 is passed to an alignment shifter 390 where it is shifted to be in alignment with the larger value. This is achieved by the control circuit 110 providing a ShiftCount value over path 395 to the alignment shifter 390. The ShiftCount value is calculated by the control circuit 110 using the ExpDiff signal output by the data path logic 100 during processing of the exponents at stage E1 of the pipeline.

The output of the alignment shifter 390 issued over path 420 consists of the aligned smaller value, a guard bit and a round bit. The guard bit and the round bit are passed over path 425 to the control circuit 110, whilst the aligned smaller value is passed over path 430 to a sum adder 450. In addition to the output over path 420, the alignment shifter 390 also outputs over path 400 the bits shifted out during the shift procedure. These bits are input to logic 405 which determines whether the bits are all zeros or all ones. A logic 1 value is output over path 410 if each bit shifted out was zero, whilst a logic 1 value is output over path 415 if each bit shifted out was one. As will be discussed in more detail later, these values are used by the control circuit 110 along with the guard and round bits output over path 425 to determine rounding.

The larger value stored in register 350 during stage E2 is passed to a multiplexer 380 along with an inverted version of that value as inverted by inverter 370. The control circuit 110 will determine from the instruction and the signs of the various input signals whether the accumulate logic is to perform an "unlike signed add" (USA), e.g. X−Y. If so, the control circuit will issue an augend negate signal 385 having a logic value of 1 to cause the multiplexer to select the inverted larger value. Otherwise, the augend negate signal will have a logic value of 0, causing the multiplexer to select the uninverted larger value.

The output from the multiplexer 380 is passed over path 440 to the sum adder 450, where it is added to the aligned smaller value. If a USA is being performed, then an AddCarryIn 445 signal generated by the control circuit 110 is set to a logic 1 value and input to the sum adder 450. This is required to ensure that the correct 2's complement of the larger value is used in the addition (the 2's complement representing the negative version of the larger value). Considering the X−Y example mentioned above, this is equivalent to −(−X+Y), and it can be seen that the sum adder will perform the sum −X+Y. The output of the sum adder 450 is then passed to the register 455 for subsequent use in stage E4 of the pipeline. Further the least significant bits L[0], L[1] and L[2] are output over path 452 to the control circuit 110 for subsequent use in determining rounding.

Figure 3D:
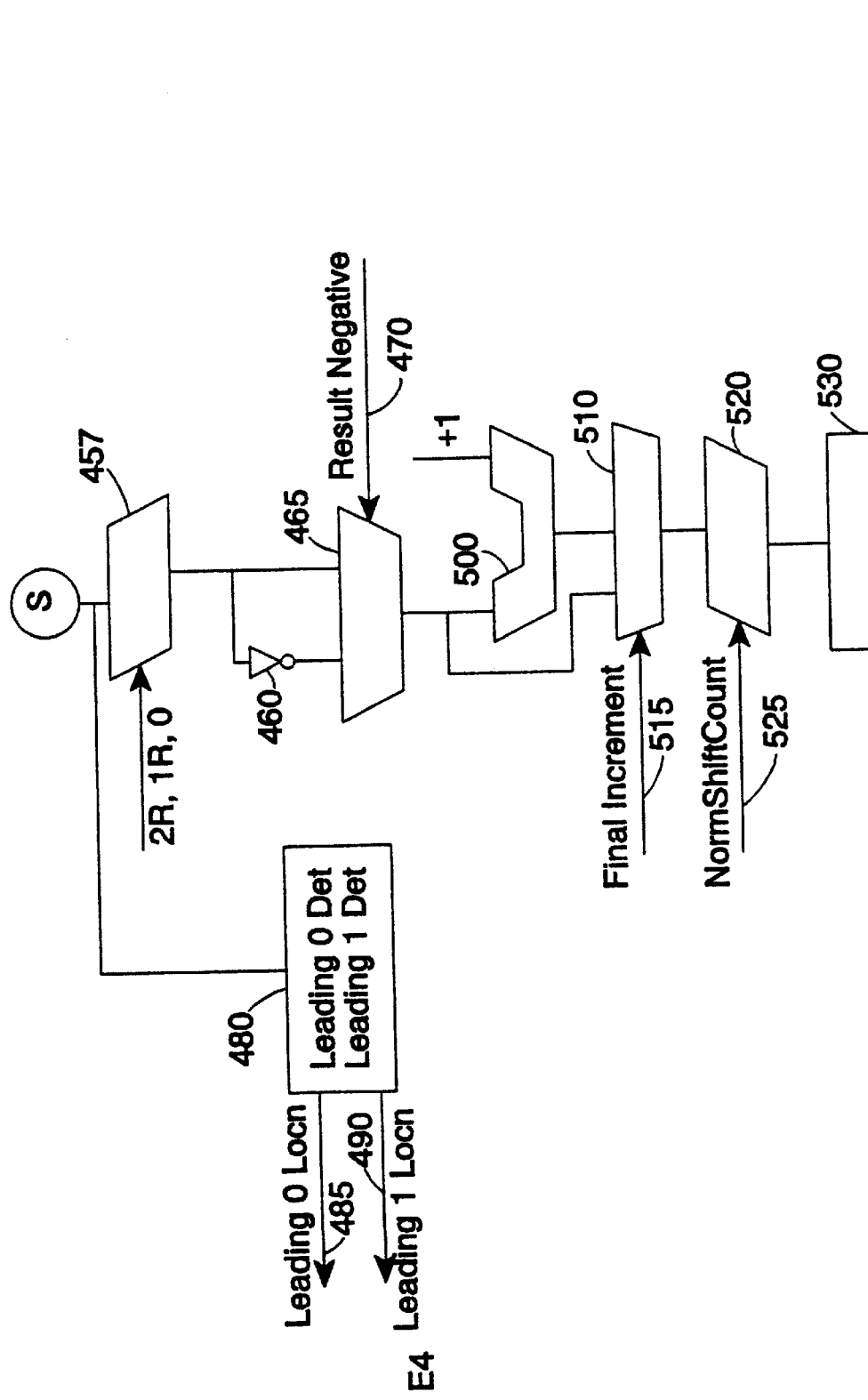

FIG. 3D illustrates the mantissa processing that is performed in stage E4 of the pipeline. The value stored in the register 455 is passed to a normalization shifter 457 which performs a right shift, if needed, on the output of the sum adder. For such USA and Like Signed Add (LSA) operations, it is possible that the output of the sum adder may have overflowed, requiring either a one or two bit right shift of the output value (effectively moving the decimal point to the left) to normalize the output. The control circuit is hence arranged to determine from the output of the sum adder 450 whether such an overflow has occurred, and to generate a control signal to the alignment shifter to cause an appropriate shift of the output to occur.

The value stored in register 455 is also passed to logic 480 where the location of the leading zero and leading one is determined. This is performed to account for USA operations where cancellation may have caused the output value of the sum adder 450 to require a left shift in order to be normalized. The leading zero location is output over path 485 to the control circuit 110, and the location of the leading one is output over path 490 to the control circuit 110. These signals are used by the control circuit to determine a NormShiftCount signal to be used in the later normalization of the mantissa. The NormShiftCount signal identifies the number of bit positions to the left that the mantissa should be shifted by to account for any cancellation due to the USA operation.

The output of the alignment shifter 457 is passed to a multiplexer 465, along with an inverted version of that value as inverted by inverter 460. The control circuit 110 evaluates whether the output of the sum adder 450 is negative, and if so issues a Result Negative control signal over path 470 to the multiplexer 465 having a logic value of 1. This causes the multiplexer 465 to select the inverted input received from inverter 460. Otherwise, the non-inverted input received directly from register 455 is selected.

The output of multiplexer 465 is passed to an incrementer 500, and to a round selection multiplexer 510. The round selection multiplexer 510 also receives the output of incrementer 500, and is responsive to a final increment signal passed over path 515 from the control circuit 110 to select one of the two inputs for outputting to a normalizer 520. The control circuit 110 determines the value of the final increment signal from MulRound generated in stage E2 and from the various signals output on paths 410, 415, 425 and 452 during stage E3 of the pipeline. The generation of the final increment signal by the control circuit 110 will be discussed in more detail later.

The normalizer 520 receives the output from the round selection multiplexer 510, and performs any normalization of that output as determined by the NormShiftCount 525 signal discussed earlier. The output from the normalizer 520 is then stored in register 530 as the mantissa of the final result.

FIG. 4B illustrates the exponent processing performed in stage E4 of the pipeline. The exponent value stored in register 690 is input to an exponent adjustment adder 700 which also receives as a second input the output of a multiplexer 710. The multiplexer 710 is controlled by a ExpAdjust signal output by the control circuit 110 indicating which of four inputs to the multiplexer 710 should be output to the exponent adjustment adder 700. Hence, if a left shift of the mantissa is performed in accordance with the NormShiftCount signal during stage E4, then the ExpAdjust signal will cause the multiplexer 710 to output the inverted NormShiftCount signal to the exponent adjustment adder 700 to cause the exponent to be adjusted in the opposite sense to the mantissa. Similarly, if instead the mantissa is shifted to the right by the shifter 457 during stage E4 of the pipeline, the ExpAdjust signal will cause the multiplexer 710 to select the appropriate adjustment to the exponent. Hence, for example, if the mantissa is shifted one bit to the right, the multiplexer 710 will output a value of 1 to cause the exponent to be incremented by 1.

The output of the exponent adjustment adder 700 is passed to an exponent incrementer 720 and to a final exponent select multiplexer 730. The final exponent select multiplexer 730 also receives the output from exponent incrementer 720, and is controlled by a FinExpSel signal from the control circuit 110 to determine which value to output to the register 740 as the exponent of the final result. If the incremented version of the mantissa overflows and is selected by the round selection multiplexer 510 shown in FIG. 3D, then the FinExpSel signal will be driven high to cause the multiplexer 730 to select the incremented exponent. It should be noted that in this instance, the overflow of the mantissa will not be accounted for in the initial normalization performed by normalizer 520, and hence the mantissa will undergo a further normalization not illustrated in FIG. 3D to account for any overflow caused by incrementing the mantissa.

Having discussed the data path logic 100 in detail, the determination logic 150 within the control circuit 110 used to generate a rounding value will now be discussed. The rounding determination performed by the determination logic utilizes seven signals generated in stage E3 of the pipeline, along with the MulRound signal generated by the determination logic in stage E2 indicating whether the multiplication result P should be rounded, in order to compute the final rounding required to be performed on the result. The seven signals from stage E3 are:

The guard (G) and round (R) bits output over path 425 resulting from the alignment shift performed by shifter 390.

The AllOnes and AllZeros signals output over paths 410 and 415, respectively, these signals resulting from checks of the bits shifted out by the shifter 390. AllOnes is true if all bits shifted out are 1's, whilst AllZeros is true if all bits shifted out are 0's. Neither is true if the bits shifted out contain both 1's and 0's.

L[2], L[1], and L[0] output over path 452, these signals being the lower three bits of the sum output by sum adder 450.

Figure 5:
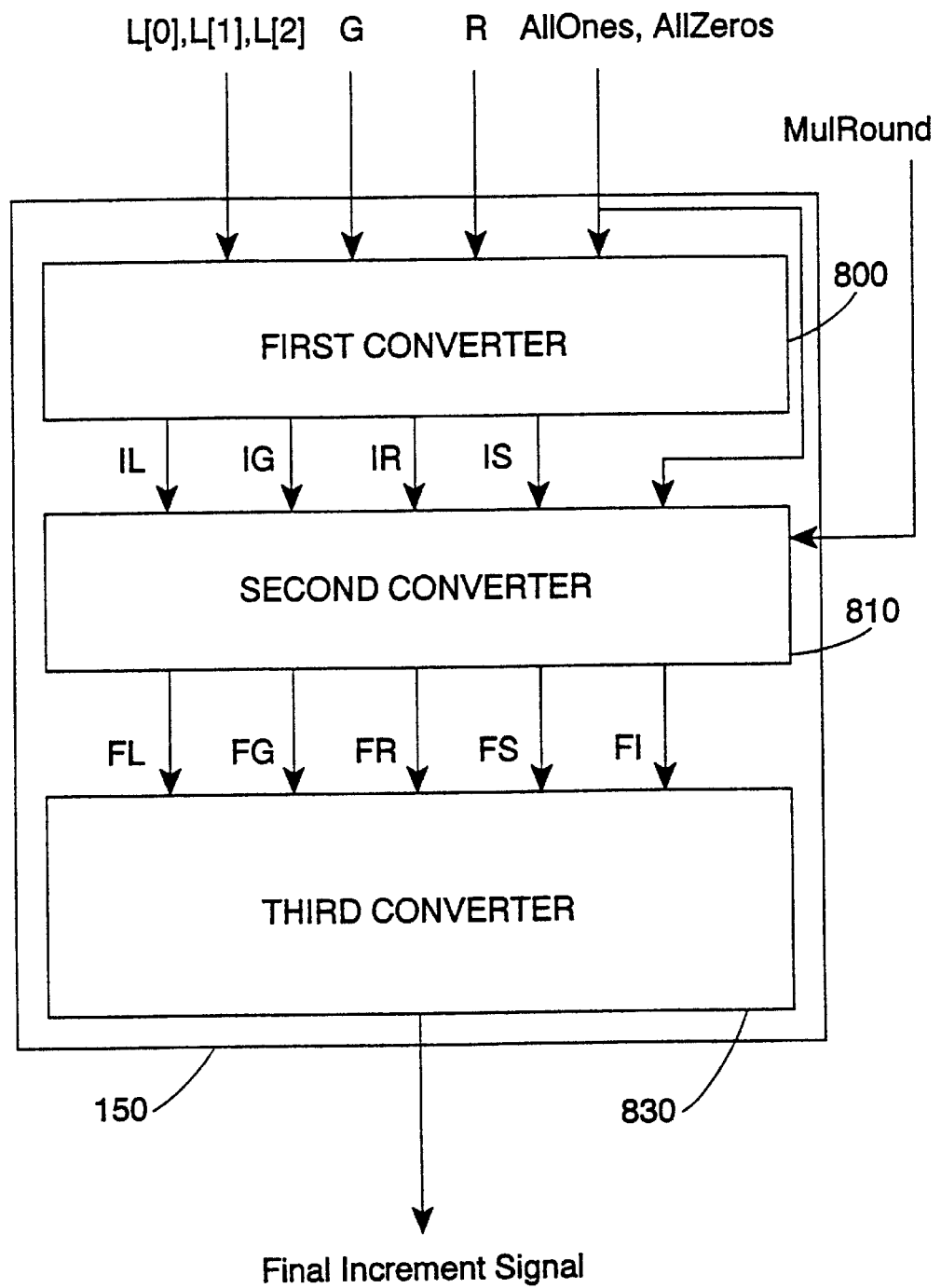
FIG. 5 illustrates the determination logic used in preferred embodiments of the present invention to determine a rounding value to be applied to the result of the floating point operation.

FIG. 5 illustrates in more detail the determination logic 150 provided within the control circuit 110. This consists of a first converter 800 for receiving the above-mentioned seven signals generated during stage E3 of the pipeline. The main purpose of the first converter 800 is to compensate for any normalization requiring right shifting that was performed during stage E4 of the pipeline. As mentioned earlier, only right shifts of 1 and 2 bits need to be provided for. The outputs from the first converter 800 are intermediate least significant bit (IL), guard (IG), round (IR) and sticky (IS) bits, which are input to a second converter 810, these values being determined in accordance with the following table:

| OUT-PUT | SHIFT RIGHT COUNT | | |
|---|---|---|---|
| | 0 | 1 | 2 |
| IL | L[0] | L[1] | L[2] |
| IG | G | L[0] | L[1] |
| IR | R | G | L[0] |
| IS | Inv(AllZeros) | R OR Inv(AllZeros) | G OR R OR Inv(AllZeros) |

In the above table, and hereafter, the term Inv(X) is used to denote the inverted value of X, whilst OR and AND represent logical OR and logical AND functions.

The intermediate rounding bits are further processed by the second converter 810, which incorporates the MulRound value, any 2's complement bit required by a negation of the sum output by the sun adder 450 (such negation being selected by the ResultNegative signal being driven high by the control circuit), and three valid signals.

The valid signals are true if the alignment operation performed by shifter 390 produced the respective rounding bit or false if the alignment did not produce the respective bit. This will be demonstrated in the following table by way of example for a double precision operation (the MOvfl signal is true (ie. 1) if the product P output from the product adder 250 is in the form 1x.yyy rather than 1.xyyy. GV is true if a valid G bit was returned by the alignment shift operation. RV and SV are likewise true if a valid R bit and S bit, respectively, were returned by the alignment shift operation):

| ShiftCount | MOvfl = 0 | | | MOvfl = 1 | | |
|---|---|---|---|---|---|---|
| | GV | RV | SV | GV | RV | SV |
| 0 | 0 | 0 | 0 | 0 | 0 | 0 |
| 1 | 1 | 0 | 0 | 0 | 0 | 0 |
| 2 | 1 | 1 | 0 | 1 | 0 | 0 |
| 3 | 1 | 1 | 1 | 1 | 1 | 0 |
| 4–53 | 1 | 1 | 1 | 1 | 1 | 1 |
| 54 | 0 | 1 | 1 | 1 | 1 | 1 |
| 55 | 0 | 0 | 1 | 0 | 1 | 1 |
| 56–63 | 0 | 0 | 1 | 0 | 0 | 1 |

The outputs of the second converter 810 are final least significant bit (FL), guard (FG), round (FR) and sticky (FS) bits, which are input to a third converter 830. These final bits are further processed by the third converter 830 to produce a rounding value (used as the Final Increment signal input to the round selection multiplexer 510 in stage E4 by applying the IEEE 754-1985 rounding formulae to the FL, FG, FR, FS, and a forced increment (FI) bits. The output of the third converter is used by the rounding logic 140 of the data path logic to round the final result.

As will be appreciated by those skilled in the art, two distinct cases exist in floating point addition, the like-signed addition and the unlike-signed addition. In a like-signed addition (LSA) the signs of the input operands are equal for an add operation and opposite for a subtraction. In an unlike-signed additions (USA) the signs are opposite for an addition and equal for a subtraction. The cases presented below are distinguished by being either a LSA or an USA operation.

As discussed earlier with reference to FIGS. 3 and 4, the determination of the 'smaller' operand or the 'larger' operand is made by comparing the exponents and designating the operand with the smaller exponent 'smaller' and the other operand 'larger.' The larger operand will be referred to as the augend, while the smaller operand will be referred to as the addend.

The second converter 810 considers six cases, namely:
Case 1: LSA, Product smaller
Case 2: LSA, Product is larger
Case 3: USA, Product is smaller, result is positive
Case 4: USA, Product is smaller, result is negative
Case 5: USA, Product is larger, result is positive
Case 6: USA, Product is larger, result is negative
Case 1: LSA, Product Smaller If the operation is a MAC, two cases exist based on the MulRound bit. If the operation is not a MAC, the MulRound bit will be 0. For both cases, the FL bit will be set to the value of IL.
MulRound=0
FG=IG
FR=IR
FS=IS
FI=0

The valid signals (GV, RV, and SV) are not required in this case. The rounding bits, if not valid, will be zero and will be incorporated into the rounding equations correctly.

MulRound = 1
This case requires the valid signals (GV, RV, and SV).

| Inputs | | | | | | Outputs | | | |
|---|---|---|---|---|---|---|---|---|---|
| GV | RV | SV | IG | IR | AllOnes | FG | FR | FS | FI |

No rounding bits valid-force increment

| 0 | 0 | 0 | 0 | 0 | 1 | 0 | 0 | 0 | 1 |

G bit valid only

| 1 | 0 | 0 | 0 | 0 | 1 | 1 | 0 | 0 | 0 |
| 1 | 0 | 0 | 1 | 0 | 1 | 0 | 0 | 0 | 1 |

G and R bits valid

| 1 | 1 | 0 | 0 | 0 | 1 | 0 | 1 | 0 | 0 |
| 1 | 1 | 0 | 0 | 1 | 1 | 1 | 0 | 0 | 0 |
| 1 | 1 | 0 | 1 | 0 | 1 | 1 | 1 | 0 | 0 |
| 1 | 1 | 0 | 1 | 1 | 1 | 0 | 0 | 0 | 1 |

The S bit is valid (G and R are not necessary to be valid. They will be zero if not valid)

| x | x | 1 | 0 | 0 | 0 | 0 | 0 | 1 | 0 |
| x | x | 1 | 0 | 0 | 1 | 0 | 1 | 0 | 0 |
| x | x | 1 | 0 | 1 | 0 | 0 | 1 | 1 | 0 |
| x | x | 1 | 0 | 1 | 1 | 1 | 0 | 0 | 0 |
| x | x | 1 | 1 | 0 | 0 | 1 | 0 | 1 | 0 |
| x | x | 1 | 1 | 0 | 1 | 1 | 1 | 0 | 0 |
| x | x | 1 | 1 | 1 | 0 | 1 | 1 | 1 | 0 |

Case 2: LSA, Product is Larger

The MulRound bit will be incorporated into the AddCarryIn signal passed to the sum adder 450 over path 445. MulRound will be forced to 0 and have no effect in Stage 4 rounding.

The Stage 4 rounding bits will be:
FL=IL
FG=IG
FR=IR
FS=IS
FI=0

Case 3: USA, Product is Smaller, Result is Positive

In this case the exponents are equal and the addend mantissa is larger than the augend mantissa, or the product exponent is less than the augend exponent by 1, but the product mantissa has overflowed and is in reality larger than the augend.

Rounding bits from the product are the correct polarity and do not need negation.

The FL, FG, FR, FS, and FI bits are computed as for Case 1.

Case 4: USA, Product is Smaller, Result is Negative

In this case the addend rounding bits must be negated as must the MulRound bit.

MulRound=0

The 2's complement bit required by the negation of the sum must be incorporated at the LSB of the inverted rounding bits.

The valid bits are not required; if a round bit does not have its corresponding valid bit set, it would be 0 and, after negation, would correctly represent the rounding situation.

| Inputs | | | Outputs | | | |
|---|---|---|---|---|---|---|
| G | IR | AllZero | FG | FR | FS | FI |
| 0 | 0 | 0 | 1 | 1 | 1 | 0 |
| 0 | 0 | 1 | 0 | 0 | 0 | 1 |
| 0 | 1 | 0 | 1 | 0 | 1 | 0 |
| 0 | 1 | 1 | 1 | 1 | 0 | 0 |
| 1 | 0 | 0 | 0 | 1 | 1 | 0 |
| 1 | 0 | 1 | 1 | 0 | 0 | 0 |
| 1 | 1 | 0 | 0 | 0 | 1 | 0 |
| 1 | 1 | 1 | 0 | 1 | 0 | 0 |

The FL bit is set to IL.
MulRound=1

Since the MulRound bit is set, the 2's complement bit required to negate the result will be canceled out by the MulRound bit according to the following identity:

−(Sum+MulRound)
=−Sum−MulRound
=Inv(Sum)+1−MulRound
=Inv(Sum)

The rounding bits are:
FL=Inv(IL)
FG=Inv(IG) AND GV
FR=Inv(IR) AND RV
FS=Inv(AllZero)
FI=0

Case 5: USA, Product is Larger, Result is Positive

In this case, the addend was in fact larger than the product and the sum does not require negation.

The FL, FG, FR, FS, and FI bits are computed as for Case 1. The MulRound bit was used in Stage 3 to zero the AddCarryIn signal. The MulRound bit is cleared before passing to Stage 4.

Case 6: USA, Product is Larger, Result is Negative

As in Case 4, the addend rounding bits must be negated. The MulRound bit was used in Stage 3 to zero the AddCarryIn signal. The MulRound bit is cleared before passing to Stage 4.

The round bits are computed as in Case 4.

The advantage, in both cycle count and instruction count, over an architecture without the FMAC capability of preferred embodiments is demonstrated by the following simple DSP "Finite Impulse Response" (FIR) filter example. In this example, 8 coefficients and 8 data items are to be multiplied and summed:

$$Acc=D0*C0+D1*C1+D2*C2+D3*C3+D4*C4+D5*C5+D6*C6+D7*C7$$

Provided the 8 coefficients, 8 data items, and the Acc are in registers, and 8 temporary registers are available, a conventional processor might perform the following operations: (FMUL and FADD operations are assumed to have a 3 cycle latency and a 1 cycle throughput.)

1. T0=D0*C0
2. T1=D1*C1
3. T2=D2*C2
4. T3=D3*C3
5. T4=D4*C4
6. T5=D5*C5
7. T6=D6*C6
8. T7=D7*C7
9. T0=T0+T1
10. T2=T2+T3
11. T4=T4+T5

12. T6=T6+T7
13. T0=T0+T2
14. T4=T4+T6
15. Acc=Acc+T0
16. Acc=Acc+T4

Assuming a single cycle per operation and a latency of 3 cycles, the first 13 operations may execute sequentially without a dependency, for 13 cycles. Operation 14 will stall for 1 cycle waiting on the result of operation 12 to complete, taking 2 cycles. The operation 15 will not stall since the stall of operation 14 allowed operation 13 writing to T0 to complete, while the final accumulate operation 16 will stall for 2 cycles waiting on the Acc value to be loaded from operation 15. The total cycle count is 16+1+2+2, i.e. 21 cycles for 16 operations.

Using the FMAC operation in the FPU 26 of preferred embodiments, the following operations will generate the same result: (FMAC, FMUL, and FADD operations have a 4 cycle latency and a 1 cycle throughput.)
1. Acc=D0*C0
2. T1=D1*C1
3. T2=D2*C2
4. T3=D3*C3
5. Acc=D4*C4+Acc
6. T1=D5*C5+T1
7. T2=D6*C6+T2
8. T3=D7*C7+T3
9. Acc=Acc+T1
10. T3=T3+T2
11. Acc=Acc+T3

In this example, the first 8 operations execute sequentially without a stall for 8 cycles. Operation 9 stalls for 1 cycle waiting on operation 6 writing to T1 to complete. Operation 10 also stalls for one cycle, while the final operation 11 stalls for 3 cycles waiting for operation 10 writing to T3 to complete. The total cycle count is 11+1+1+3+3, i.e. 19 cycles for 11 operations.

The primary benefit of the FMAC operation for DSP functions is seen when the FIR operation is unrolled to the depth of the pipeline. For instance, if the same 8 data points and 8 coefficients were grouped in sets of 4 and partial FIR operations were done on 4 data points, the following calculations could be done with no stalls:
Acc0=D0*C0+D1*C1+D2*C2+D3*C3
Acc1=D1*C0+D2*C1+D3*C2+D4*C3
Acc2=D2*C0+D3*C1+D4*C2+D5*C3
Acc3=D3*C0+D4*C1+D5*C2+D6*C3

The following FMAC operations in the FPU 26 of preferred embodiments would perform these equations with no stall conditions:
1. Acc0=D0*C0
2. Acc1=D1*C0
3. Acc2=D2*C0
4. Acc3=D3*C0
5. Acc0=D1*C1+Acc0
6. Acc1=D2*C1+Acc1
7. Acc2=D3*C1+Acc2
8. Acc3=D4*C1+Acc3
9. Acc0=D2*C2+Acc0
10. Acc1=D3*C2+Acc1
11. Acc2=D4*C2+Acc2
12. Acc3=D5*C2+Acc3
13. Acc0=D3*C3+Acc0
14. Acc1=D4*C3+Acc1
15. Acc2=D5*C3+Acc2
16. Acc3=D6*C3+Acc3

This sequence is repeated for the 8 data and 8 coefficient operations given above, again with no stalls. The throughput in the above example is 1 multiply-accumulate operation per cycle, resulting in the 8 data and 8 coefficient example having an effective cycle count of 8. A conventional processor using the same loop unrolling technique would require 16 operations for the 8 data and 8 coefficient problem simply due to the fact that each operation requires a multiply and an add, each requiring 1 cycle. The conventional processor would require 8 instructions while the FPU 26 of preferred embodiments only requires 4.

Although a particular embodiment of the invention has been described herewith, it will be apparent that the invention is not limited thereto, and that many modifications and additions may be made within the scope of the invention. For example, although the preferred embodiment has been described in relation to a CPU with a physically separate coprocessor, this need not be the case. For example, the floating point unit may be provided within the main processor. In addition, various combinations of the features of the following dependent claims could be made with the features of the independent claims without departing from the scope of the present invention.

We claim:

1. A data processing apparatus for performing a multiply-accumulate operation A+(B*C) in response to a single instruction identifying said multiply-accumulate operation, comprising:

a multiplier for multiplying values B and C to generate an unrounded multiplication result, the multiplier adapted to generate first data required for rounding determination, said first data dependent upon said unrounded multiplication result;

an adder for adding the unrounded multiplication result to a value A to generate an unrounded multiply-accumulate result, the adder adapted to generate second data required for rounding determination;

determination logic for using the first and second data to determine one or more rounding values required to produce a final multiply-accumulate result equivalent to the execution of a separate multiply instruction incorporating rounding, followed by a separate add instruction incorporating rounding; and rounding logic for applying the one or more rounding values to generate the final multiply-accumulate result.

2. A data processing apparatus as claimed in claim 1, wherein the determination logic is adapted to generate a single rounding value to be applied by the rounding logic to the unrounded multiply-accumulate result to generate the final multiply-accumulate result.

3. A data processing apparatus as claimed in claim 1, wherein the first data generated by the multiplier comprises guard and sticky bits, and the determination logic comprises first logic for determining a multiplier rounding value from the first data.

4. A data processing apparatus as claimed in claim 3, wherein the first data further comprises one or more least significant bits of the multiplication result.

5. A data processing apparatus as claimed in claim 3, wherein the determination logic further comprises second logic for determining the one or more rounding values from the multiplier rounding value and the second data.

6. A data processing apparatus as claimed in claim 1, wherein the adder comprises an alignment shifter for aligning the smaller of the value A and the multiplication result prior to performing the addition, and a detection unit for detecting whether the bits shifted out by the alignment shifter are all ones or all zeros.

7. A data processing apparatus as claimed in claim 6, wherein the second data generated by the adder comprises guard and round bits, the output of the detection unit, and a number of least significant bits of the unrounded multiply-accumulate result.

8. A data processing apparatus as claimed in claim 1, wherein the multiplier comprises a multiplication unit for generating a partial result in carry-save format and a product adder for producing the multiplication result.

9. A data processing apparatus as claimed in claim 8, wherein the multiplier further comprises a sticky adder for adding together a number of least significant bits of the partial product generated by the multiplication unit, and a guard and sticky bit generator for generating guard and sticky bits from the output of the sticky adder.

10. A data processing apparatus as claimed in claim 1, wherein the unrounded multiply-accumulate result comprises a mantissa and an exponent, the data processing apparatus further comprising an incrementer for incrementing the mantissa, and the rounding logic comprising a multiplexer for outputting either the mantissa or the incremented mantissa as a final mantissa of the final multiply-accumulate result, in dependence upon one of said one or more rounding values generated by the determination logic.

11. A data processing apparatus as claimed in claim 10, wherein said one rounding value comprises a final increment signal input to the multiplexer to indicate whether the mantissa or the incremented mantissa should be output as the final mantissa.

12. A data processing apparatus as claimed in claim 11, wherein the rounding logic further comprises exponent incrementing logic for incrementing the exponent if the incrementing of the mantissa resulted in an overflow, and the incremented mantissa is selected as the final mantissa.

13. A data processing apparatus as claimed in claim 1, wherein the determination logic comprises a first converter for receiving the second data generated by the adder and compensating for any shift right normalization applied to the unrounded multiply-accumulate result by the adder.

14. A data processing apparatus as claimed in claim 13, wherein the determination logic is adapted to determine a multiplier rounding value from the first data and the determination logic further comprises a second converter for applying the multiplier rounding value to the output of the first converter circuit.

15. A data processing apparatus as claimed in claim 14, wherein the determination logic further comprises a third converter for applying a predetermined rounding formula to the signals output from the second converter to generate the one or more rounding values.

16. A method of performing a multiply-accumulate operation (A+(B*C) in response to a single instruction identifying said multiply-accumulate operation, comprising:

multiplying values B and C to generate an unrounded multiplication result, and generating first data required for rounding determination, said first data dependent upon said unrounded multiplication result;

adding the unrounded multiplication result to a value A to generate an unrounded multiply-accumulate result, and generating second data required for rounding determination;

using the first and second data to determine one or more rounding values required to produce a final multiply-accumulate result equivalent to the execution of a separate multiply instruction incorporating rounding, followed by a separate add instruction incorporating rounding; and applying the one or more rounding values to generate the final multiply-accumulate result.

* * * * *